C. W., W. W. & G. E. WELTY.
CONNECTOR FOR GARMENT AND HOSE SUPPORTERS.
APPLICATION FILED JULY 31, 1914.
1,202,132.
Patented Oct. 24, 1916.
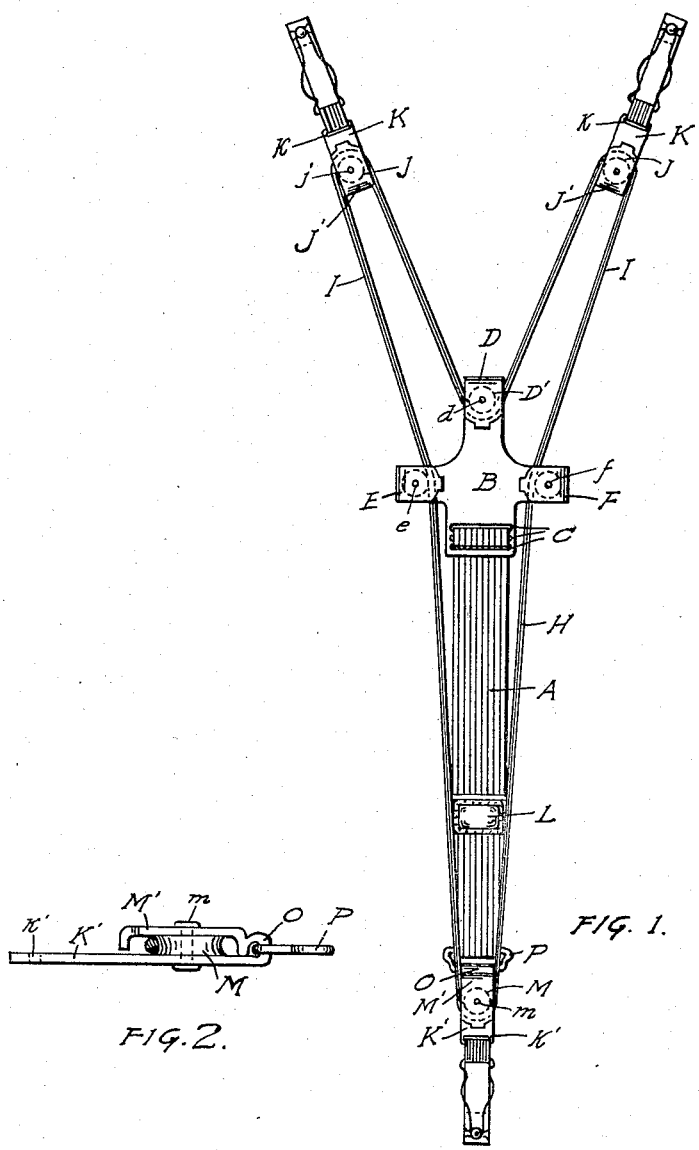
WITNESSES:
INVENTORS:
ATTORNEY.

UNITED STATES PATENT OFFICE.

CHARLES W. WELTY, WILLIAM W. WELTY, AND GEORGE E. WELTY, OF ST. JOSEPH, MISSOURI.

CONNECTOR FOR GARMENT AND HOSE SUPPORTERS.

1,202,132.          Specification of Letters Patent.      Patented Oct. 24, 1916.

Application filed July 31, 1914. Serial No. 854,223.

*To all whom it may concern:*

Be it known that we, CHARLES W. WELTY, WILLIAM W. WELTY, and GEORGE E. WELTY, citizens of the United States of America, residing at the city of St. Joseph, in the county of Buchanan and State of Missouri, have invented certain new and useful Improvements in Connectors for Garment and Hose Supporters, of which the following is a specification.

The object of our invention is to provide a connector to be used on different parts of a supporter that will hold a man's, woman's or child's shirt or other apparel down and the hose or stockings up at the same time. Said connector may be used on several other kinds of supporters or suspenders. By placing a connector on different parts of a supporter it will automatically adjust itself to almost any possible position of the person yielding to each position of the person regardless of whether the body leans to the right or left, forward or backward, the supporter not drawing any of the apparel at any time sufficiently rigid to cause discomfort to the person, or strain upon any article where the connector is attached.

The improvement sought by us in this invention particularly relates to Figure 2, the roller bearing plate having connection between the lower part of an elastic and an endless cord, hose or stockings, or other wearing apparel. The elastic, one end of which is attached to a central plate, extends down and loops through a link on one end of said roller bearing plate; by the elastic passing through said link it can be easily adjusted and by one end of the elastic being attached to a central plate and the other end being looped through said link it will keep the central plate in the proper position, and by an endless cord passing over the roller bearing plate it will give easy movement regardless of the position of the person. One end of the roller bearing plate is to be used for attachment of a suitable fastener to the hose or other wearing apparel.

We accomplish our object by the construction shown in the accompanying drawings, in which:

Fig. 1 is a front view of the supporter; and Fig. 2 is a side view of a roller bearing plate near the bottom of the supporter showing a shield and roller and a socket having engagement with a link.

Similar letters refer to corresponding parts throughout the several views.

In the drawings A represents an elastic or tape strap serving as an adjuster for the device.

B is a central roller bearing plate, its lower extension provided with three corresponding cross slots C C with which the top end of elastic A engages rigidly. An upper extension of the face of said plate is provided with a shield D integral therewith having a grooved wheel D' revoluble therein on a pin *d* serving as an axle, its ends engaging with said upper extension plate and the shield thereon. Opposite side extensions of said central roller bearing plate are provided with shields E and F and grooved wheels E' and F' having, respectively, axles *e* and *f*. H is an endless cord or elastic inserted between said grooved wheels E' and F' and the inner sides of shields E and F and between grooved wheel D' and the lower side of shield D. The parts of the cord H extending above said wheels and shields are adapted to form two diverging looped arms I, I, each operating over a grooved wheel J revoluble between a plate I' and a shield J' on a pin *j*, similar to those already described. Said last mentioned shields have integral plates K K extending upward. These upwardly extended plates are each provided with a slot *k* with which suitable devices may be attached to form connection with a shirt, waist or other inner garment worn by either a man or woman on the upper part of the body. The lower end of elastic A is looped through a link P and is provided with a slide buckle L permitting the lengthening or shortening of the elastic or device to any length required.

A grooved wheel M, shield M' and pin *m* with supporting plate K' and slot *k'* correspond in all particulars with those at the upper loops or arms II except being placed in reverse position and being provided with a socket O which is integral with plate K' and connected with elastic H by means of said link P.

It will be readily understood from the foregoing description that endless cord H being at all times in revoluble engagement with every wheel in the device will freely yield to every movement of the person automatically regulating itself to any position without having any stationary pull on the garments.

What we claim and desire to secure by Letters Patent, is:

A garment and hose connector comprising a metal plate, a small socket formed by said plate being looped over at about midway of the plate, a link inserted in said socket to receive an elastic tape, a grooved wheel revoluble inside said shield for an endless cord to pass over, one end of said plate having a cross slot or other suitable means in which to attach a suitable hose fastener.

In testimony whereof we affix our signatures in presence of two witnesses.

CHARLES W. WELTY.
WILLIAM W. WELTY.
GEORGE E. WELTY.

Witnesses:
MAYME T. REILLY,
E. F. HARTZELL.

Copies of this patent may be obtained for five cents each, by addressing the "Commissioner of Patents, Washington, D. C."